United States Patent Office 2,715,090
Patented Aug. 9, 1955

2,715,090

ORGANIC PENICILLIN SALT SOLUTIONS HAVING A DELAYED ACTION AND PROCESS FOR MAKING SAME

Henry Penau, Paris, Guy Hagemann, Vincennes, and Rene Claude, Paris, France, assignors to Les Laboratoires Francais de Chimiotherapie, Paris, France, a body corporate of France No Drawing. Application April 15, 1950,
Serial No. 156,228

Claims priority, application France May 25, 1949

7 Claims. (Cl. 167—65)

The present invention relates to new organic penicillin compounds and more particularly to a method for the preparation of solutions of said compounds, these compounds and their solutions possessing an anti-bacterial effect of such duration as none of the conventional compounds displays.

It is an object of the present invention to provide new organic penicillin compounds and methods for the preparation of their solutions, wherein these compounds and their solutions rave the attributes of prolonged baceteriorstatic efficacy and the solutions of said new organic penicillin compounds are particularly adapted for use for painless and efficient parenteral and intramuscular administration.

It is a further object of the present invention, to provide penicillin compounds of increased bacteriostatic efficacy, adapted to form solutions rather than suspensions, said compounds remaining for a certain time in perfect and complete solution in vitro (prior to administration) but crystallizing immediately in vivo (subsequent to administration).

In their application of September 23, 1948, Serial No. 50,880, entitled "Compounds of Penicillin Having a Prolonged Effect and Process for Manufacturing the Same," some of the applicants described a group of new organic penicillin compounds which were found to possess a bacteriostatic efficacy of greatly prolonged duration. These compounds are obtained by reacting penicillin with alkaloid bases such as for instance those derived from quinine. A large number of the compounds obtained by means of this reaction are, however, substantially insoluble in water or in the blood, and in order to obtain the benefits of their prolonged bacteriostatic effect they must be administered parenterally in the form of oil suspensions. The necessity for employing oil suspensions presents a substantial inconvenience as it requires, for instance, the employment of injection needles of large diameter, in order to avoid obstruction of the needle by the suspended crystals, which causes substantial suffering to the patient.

The applicants have now found that the reaction of penicillin with the bases derived from alkaloids, to form new organic penicillin compounds, possessing prolonged anti-bacterial or bacteriostatic effects may be completed in vivo, i. e. the crystallization of the penicillin-alkaloid compound may be caused to take place in the body itself. A true solution of the penicillin alkaloid compound which has been prepared immediately prior to injection is employed. It is thus possible to overcome the necessity which heretofore required the employment of crystalline oil suspensions by employing these novel solutions. The solutions of this invention are obtained by dissolving a penicillin salt, in its micro-crystalline form, in a suitable solvent, said solvent containing already in solution the alkaloid base. For example, the potassium or sodium salt of penicillin is dissolved in propylene glycol, which already contains the quinine in total solution.

Depending on the type of solvent employed, preferably propylene glycol in the presence of some water and under proper conditions of dilution, no crystals are formed when the penicillin is introduced into the solution, but a clear solution is formed immediately suitable for use.

When the penicillin salt crystals are brought into solution in the solvent containing the alkaloid base, a complete solution is rapidly formed which is suitable for almost instantaneous injection. This true solution comprising the dissolved penicillin alkaloid will crystallize in vitro only after long periods of time and under specific conditions. It is only in vivo, i. e. upon contact with the body that the penicillin alkaloid compound will crystallize immediately.

The therapeutic effect of the solution hereinabove set forth is the same as that of the penicillin alkaloid compound when employed in oily suspensions.

In order to render the injection of the solution painless, it is possible to employ an anaesthetic, such as, for instance, butyl-p-amino benzoate, in combinatiton therewith.

The process set forth hereinbelow for the preparation of a true penicillin alkaloid solution is applicable to the various analogous salts of penicillin formed by penicillin with other alkaloids.

The following example serves to illustrate the method of preparing a true solution of a penicillin alkaloid compound, without, however, limiting the invention to the example set forth.

Example 1

In order to prepare the solvent containing the alkaloid base already in solution, 14 grams of quinine formate are dissolved in 25 cc. of propylene glycol, 1 gram of butyl-p-amino benzoate is added to said solution, 35 cc. of double-distilled water are stirred into the solution and the solution is made up to 100 cc. by further addition of propylene glycol.

The solution thus obtained is filtered, filled into ampoules at the rate of 1.6 cc. per ampoule, and sterilized. The corresponding container of penicillin contains in its dried form a quantity representing 300,000 units of crystalline penicillin G for example the potassium salt, yielding 185 to 200 mg. of micro-crystalline sterilized powder.

For therapeutic use one dissolves the powder in a container of penicillin (either the potassium or sodium salt) by adding one ampoule of the solvent solution to the powder, and the true solution thus obtained may be injected without delay parenterally into suitable muscular tissue.

What is claimed is:

1. A therapeutic preparation active against bacterial infections, comprising an injectable vehicle consisting of a mixture of propylene glycol and a miscible proportion of water, carrying in solution the reaction product of a penicillin salt and a quinine salt, said salts being present in about equimolecular amounts, the vehicle maintaining said reaction product in solution in vitro, said injectable vehicle, upon injection into human tissue, depositing said reactive product in such tissue, said reaction product precipitating in situ in such tissue and being slowly absorbed by the human system over a prolonged period of time, said reaction product being present in said vehicle in an amount sufficient to rapidly precipitate upon injection on contact with the body fluids.

2. A therapeutic preparation active against bacterial infections according to claim 1, wherein the penicillin salt is an alkali salt of penicillin.

3. A therapeutic preparation active against bacterial infections according to claim 1, wherein the penicillin salt is sodium penicillin.

4. A therapeutic preparation active against bacterial infections according to claim 1, wherein the penicillin salt is potassium penicillin.

5. A therapeutic preparation active against bacterial infections according to claim 1, wherein the quinine salt is quinine formate.

6. In a method of preparing an injectable penicillin-quinine salt solution, the steps comprising dissolving a quinine salt in propylene glycol, adding water to said solution, and dissolving, shortly before injection, an equimolecular amount of a water soluble penicillin salt in said quinine salt solution, the amount of water added to said quinine salt solution in propylene glycol being insufficient to immediately precipitate the penicillin-quinine salt formed on adding said penicillin salt to said quinine salt solution, the resulting solution of the penicillin-quinine salt containing an amount of said penicillin-quinine salt sufficient to rapidly precipitate upon injection on contact with the body fluids, on injection into human tissue, depositing in such tissue said penicillin-quinine salt, said penicillin-quinine salt precipitating in such tissue and being slowly absorbed by the human system over a prolonged period of time.

7. The method of preparing an injectable penicillin-quinine salt solution according to claim 6, wherein the amount of water added to said quinine salt solution in propylene glycol is sufficient to produce an aqueous propylene glycol solution containing about 35% of water.

References Cited in the file of this patent

UNITED STATES PATENTS

| | | |
|---|---|---|
| 2,483,382 | Goldberg et al. | Sept. 27, 1949 |
| 2,487,975 | Koree | Nov. 15, 1949 |
| 2,491,537 | Welch | Dec. 20, 1949 |
| 2,493,625 | Goldberg et al. | July 3, 1950 |
| 2,515,898 | Rhodehamel | July 18, 1950 |
| 2,600,344 | Van Meter | June 10, 1952 |

FOREIGN PATENTS

| | | |
|---|---|---|
| 579,937 | Great Britain | Aug. 21, 1946 |
| 610,371 | Great Britain | Oct. 17, 1947 |

OTHER REFERENCES

Destouches et al., "Comptes Rendus Acad. Sci." (Paris), vol. 228, June 27, 1949, pp. 2066 to 2068.

Monash, "Science," vol. 106, Oct. 17, 1947, p. 370.

Abraham, "Brit. J. Expt'l. Path.," vol. 23, June 1942, p. 108.

Merck Report, CMR—M—XV—b, March 31, 1944, p. 1, publ. 1947.

Monash, J. Investigative Dermatology, Sept. 1947, p. 157.

Senger et al., "Penicillin in Propylene Glycol," J. Urology, Jan. 1946, pp. 138 to 142.

Ferlauto et al., "Stability of Penicillin in Glycerine and in Glycols," Amer. J. Pharmacy, March 1947, p. 119.

Meleney, "Treatment of Mixed Infections With Penicillin," reprinted from J. A. M. A., Jan. 19, 1946, pp. 121 to 124, p. 2 of reprint," . . . compatibility of penicillin . . . in a carbowax 4,000-propylene glycol base."

Roberts et al., "Penicillin B . . . ," J. Biol. Chem., Jan. 1943, vol. 147, pp. 47 to 58, at p. 51.

Proc. Soc. Exptl. Biol. & Med., Mar. 1945, p. 185, 1st complete paragraph.

The Lancet, "Penicillin-Phenoxetol Cream," Mar. 31, 1945, p. 410.